(12) United States Patent
Habering et al.

(10) Patent No.: US 11,955,784 B2
(45) Date of Patent: Apr. 9, 2024

(54) ENERGY GUIDING CHAIN WITH WEAR DETECTION

(71) Applicant: igus GmbH, Cologne (DE)

(72) Inventors: Richard Habering, Cologne (DE); Sebastian Krista, Hennef (DE); Konstantin Schmer, Cologne (DE)

(73) Assignee: igus GmbH, Cologne (DE)

( * ) Notice: Subject to any disclaimer, the term of this patent is extended or adjusted under 35 U.S.C. 154(b) by 774 days.

(21) Appl. No.: 17/048,964

(22) PCT Filed: Jan. 18, 2019

(86) PCT No.: PCT/EP2019/051216
§ 371 (c)(1),
(2) Date: Dec. 31, 2020

(87) PCT Pub. No.: WO2019/201482
PCT Pub. Date: Oct. 24, 2019

(65) Prior Publication Data
US 2021/0151973 A1 May 20, 2021

(30) Foreign Application Priority Data
Apr. 21, 2018 (DE) .................... 20 2018 102 239.3

(51) Int. Cl.
*H02G 11/00* (2006.01)
*F16G 13/16* (2006.01)
*H02G 3/04* (2006.01)

(52) U.S. Cl.
CPC .......... *H02G 11/006* (2013.01); *F16G 13/16* (2013.01); *H02G 3/0475* (2013.01)

(58) Field of Classification Search
CPC ..... F16G 13/16; H02G 11/006; H02G 3/0475
See application file for complete search history.

(56) References Cited

U.S. PATENT DOCUMENTS 6,745,555 B2 6/2004 Hermey et al.
6,945,027 B2 9/2005 Blase
(Continued)

FOREIGN PATENT DOCUMENTS

CA 3011651 A1 8/2017
DE 9014027 U1 1/1991
(Continued)

OTHER PUBLICATIONS

English translate (WO2017129805A1), retrieved date Aug. 5, 2023.*
(Continued)

*Primary Examiner* — Matthew Katcoff
*Assistant Examiner* — Mohammed S. Alawadi
(74) *Attorney, Agent, or Firm* — Cahn & Samuels, LLP

(57) ABSTRACT

An energy guiding chain (1) includes at least one detection unit (10, 20, 30, 40, 50, 120) for detecting wear on at least one chain link. The detection unit (10, 20, 30, 40, 50, 120) according to one embodiment includes a first electric component (11, 41, 51, 121) on a first chain link and a second electric component (12, 42, 52, 122), which is provided on an adjacent second chain link connected to the first chain link in an articulated manner. The first and second electric components interact in a contactless manner, for example in an inductive, magnetic, or capacitive manner, in order to change the coupling in the event of radial and/or axial play in the joint connection between the chain links due to wear.

20 Claims, 4 Drawing Sheets

(56) References Cited

U.S. PATENT DOCUMENTS

| | | |
|---|---|---|
| 7,439,446 B2 | 10/2008 | Blase et al. |
| 7,444,800 B2 | 11/2008 | Hermey |
| 9,250,058 B2 | 2/2016 | Backes et al. |
| 2019/0040935 A1 | 2/2019 | Hermey et al. |
| 2020/0056947 A1 | 2/2020 | Habering et al. |

FOREIGN PATENT DOCUMENTS

| | | | |
|---|---|---|---|
| DE | 19800380 A1 | 7/1999 | |
| DE | 202004005858 U1 | 7/2004 | |
| DE | 102010046778 A1 | 3/2012 | |
| DE | 202015002097 U1 | 7/2016 | |
| DE | 202016000501 U1 * | 4/2017 | ............ F16G 13/16 |
| DE | 202016102134 U1 * | 6/2017 | |
| DE | 202017102410 U1 | 9/2017 | |
| EP | 1521015 A2 | 4/2005 | |
| EP | 1616376 B1 | 10/2006 | |
| EP | 1340299 B1 | 5/2007 | |
| GB | 25638 | 9/1905 | |
| WO | 02086349 A1 | 10/2002 | |
| WO | 2007121713 A1 | 11/2007 | |
| WO | 2017129805 A1 | 8/2017 | |
| WO | WO-2017129805 A1 * | 8/2017 | ............ F16G 13/16 |

OTHER PUBLICATIONS

English translate (DE202016102134U1), retrieved date Aug. 5, 2023.*
English translate (DE202016000501U1), retrieved date Aug. 5, 2023.*
Brazil National Institute of Industrial Property, Preliminary Office Action in Patent Application No. BR112020020922-8, dated Jan. 5, 2023, all pages.
Japan Patent Office, Notification of Reasons for Rejection in Patent Application No. 2021-506044, dated Nov. 1, 2022, all pages.
European Patent Office, English Abstract for DE202004005858 U1, printed on Oct. 7, 2020.
European Patent Office, English Abstract for DE202015002097 U1, printed on Oct. 7, 2020.
European Patent Office, English Abstract for EP0932018 A2, printed on Oct. 7, 2020.
European Patent Office, English Abstract for EP1521015 A2, printed on Oct. 7, 2020.
European Patent Office, International Preliminary Examination Report for PCT Application No. PCT/EP2019/051216, dated Oct. 5, 2020, pp. 4 and 6.
Deutsches Patent- und Markenamt, search report for DE 20 2018 102 239.3, dated Nov. 8, 2018, p. 2.
Czichos, Horst et al., "Das Ingenieurwissen," May 31, 2013, pp. H22-H30.
Hoffmann, Joerg, "Taschenbuch der Messtechnik," 2011, pp. 220-223, 228-231, 258-261.
European Patent Office, English Abstract for Office Action Code 6.23.
Japan Patent Office, English Abstract for Patent Application No. 2021-506044, Oct. 20, 2022.

* cited by examiner

ENERGY GUIDING CHAIN WITH WEAR DETECTION

The invention relates in general to a solution to the problem of wear detection in an energy guide chain, for example to prevent failure of the energy guide chain and thus of the supplied machine or installation.

A generic energy guide chain serves for protected dynamic guidance of lines, such as cables, hoses or the like, between a first connection end and a second connection end, wherein at least one connection end is movably, e.g. horizontally, displaceable. The energy guide chain is constructed from a number of appropriately configured chain links, wherein each chain link has at least one link plate and in most cases two opposing "side plates". The link plates of adjacent chain links are each connected together in the longitudinal direction in the manner of a rotary joint by an articulated joint, generally with a nominal swivel axis. The articulated joint may in particular be formed in each case by a joint pin at one end region of the one link plate and a corresponding joint receptacle at the overlapping end region of the adjoining link plates. This type of articulated connection has an intended or nominal swivel axis, about which the chain links are ideally bendable or swivelable relative to one another to form a deflection arc.

The invention relates in particular to such an energy guide chain which is additionally equipped with electrotechnical wear detection.

EP 1 521 015 A2 proposed various approaches, cf. for example FIG. 2 or FIG. 8 therein, for electrotechnical identification of critical wear at the narrow sides of the link plates.

A further development was proposed in WO 2017/129805 A1. Wear-related abrasion, for example at the narrow sides, can herewith be wirelessly sensed using radio modules, which may for example be mounted as modular abrasion sensors on the chain links, as an original element or indeed as a retrofitted element of an energy guide chain.

The teaching of the above two patents is based on the detection of wear which arises through sliding friction on the outsides of the chain links over a long service life. This approach is not equally suitable for all energy guide chains, however.

In particular, energy guide chains for long travel paths, which are equipped with rollers for the upper run to run on the lower run, i.e. "roller chains", typically exhibit little to no wear at the narrow sides.

The object of the present invention is therefore to propose an alternative solution for wear detection, which is optionally in particular also suitable for energy guide chains with rollers.

This object is achieved by an energy guide chain as claimed in claim 1, and independently thereof by a link plate as claimed in claim 18, a crosspiece as claimed in claim 19 and an internal part as claimed in claim 20.

It is first of all proposed to provide a generic energy guide chain with at least one detection unit for detecting wear on at least one chain link.

According to one aspect, provision is made according to the invention for the at least one detection unit to comprise a first electrical component, which is attached to a first chain link, and a second electrical component, which is attached to an adjacent second chain link connected in articulated manner to the first chain link. According to the invention, the components here interact contactlessly, in particular using suitable field coupling, for example they interact inductively, magnetically and/or capacitively. The electrical components may in particular be coupled by inductive or capacitive coupling, preferably with signal transmission. The coupling may also proceed primarily magnetically. In this way, a change in the coupling in the case of wear-related occurrence of radial and/or axial play in the articulated joint between the first and second chain links can be sensed, in particular sensed by measuring instruments or by other signal processing.

The coupled components have a nominally predetermined orientation relative to one another, in particular with regard to their field coupling. They can be attached to the respective chain link with a predetermined orientation relative to the articulated joint, e.g. to the nominal swivel axis.

A core concept of the invention is based on sensing wear at the articulated joints between chain links or link plates and not, as in the prior art, for example wear at the narrow sides of the chain links.

In the simplest embodiment just one pair of chain links connected articulatedly together is equipped with a detection unit comprising two contactlessly coupled electrical components. Suitable electrical components here are conventional circuit components, in particular coils or capacitor electrodes, which are supplied with a signal, or indeed purely passive components outside a circuit, for example magnetically active parts such as permanent magnets or the like.

An electrical component may in the present case be any component with electrotechnical effect, in particular with regard to an effect in the electrical field and/or in the magnetic field (static or dynamic).

Components for primary inductive or magnetic field coupling or indeed primary capacitive field coupling may be used to this end. Each one of the two components is attached to one of the two chain links, e.g. to the link plates or an attachment on or in the chain link, in a predetermined spatial arrangement and orientation, for example fixedly with regard to the respective chain link. In particular, a predefined orientation of the respective field effect is in this case to be achieved.

Relative motion between the chain links, in particular in the longitudinal direction of the energy guide chain, thus leads to corresponding relative motion between the electrical components. The spatial orientation of the components may in particular be selected in such a way with regard to the nominal swivel axis of the articulated joint that, in the case of unintended radial and/or axial play in the articulated joint between the selected chain links, a change in the nominal coupling (in particular the coupling when new and wear-free) is ascertainable. Different components and orientations are possible. Coupling proceeds contactlessly in particular via an electric field, for example an electromagnetic or electrostatic field. The field coupling may in this case proceed in particular primarily in the spatial region of the articulated joint between the selected chain links.

In one embodiment, the detection unit may for example be configured according to the Hall sensor principle. In this case, a magnet, preferably a permanent magnet, and a Hall element interacting with the magnet may be provided as the electrically interacting main components.

In a further embodiment, the detection unit may be adapted primarily to inductive coupling and to this end comprise as components a first coil and a second coil. The coils may for example be embodied as flat coils, enabling a compact construction.

With regard to orientation, the coils may, irrespectively thereof, be arranged opposingly in particular coaxially with the nominal swivel axis of the articulated joint (hereinafter:

nominal axis). The nominal axis here corresponds, apart from unavoidable production-related play, to the intended swivel axis when new (without abrasion/wear of the joint parts). In the case of a coaxial arrangement, the effect of wear-related joint play is a detectable or measurable subsequent alignment deviation from the coaxial nominal position.

To reinforce the magnetic coupling, it is advantageous for both coils to have a respectively associated magnetic core, for example a cup core half of flat construction. The coils may also share a common core. The magnetic core may also optionally be arranged coaxially with the nominal swivel axis of the articulated joint. In principle, a magnetic core also improves susceptibility with regard to interference signals or EMC compatibility.

In one further embodiment, the first and second coils are embodied as cylindrical coils. These may optionally be oriented coaxially or indeed perpendicularly to the nominal axis of the articulated joint. In the case of a perpendicular orientation, a common cylindrical magnetic core, for example a ferrite core, may be attached to the first or second chain link coaxially with the nominal axis, such that in the operating position the magnetic core is arranged between the cylindrical coils. In the latter embodiment, radial play directly modifies the necessary air gap between the magnetic core and the coils perpendicular thereto.

As an alternative or optionally also in addition to a configuration for inductive coupling, one or each detection unit may comprise as components, for forming a capacitor, a first electrode (or capacitor electrode) and a second electrode, wherein the electrodes in each case have an axis of symmetry which is arranged coaxially with the nominal axis. The electrodes may in particular take the form of circular disks, in order to surround the joint pin or the joint receptacle. The use of capacitive or inductive coupling is dependent on application. If a relatively long longitudinal portion is to be monitored, inductive coupling can be installed at low cost in the form of cascade circuitry.

A cascade circuit over the entire energy guide chain, over every nth or all the articulated joints, also allows breakage detection, i.e. monitoring of chain breakage, in addition or as an alternative to wear detection. In this case too, axial offset generally varies very significantly.

In typical energy guide chains, to form the articulated joint between adjoining chain links each link plate in each case has a pin at a first end region and a receptacle corresponding to the pin at a second end region, in order to form a rotary joint of the pin/hole type. In such chains, in the case of at least two articulatedly connected link plates, the first electrical component may be arranged on the pin of the one link plate and the second electrical component on the receptacle of the other link plate. The components thus lie directly at or optionally in the articulated joint.

In particular with a plurality of inductively coupling detection units, at least one critical longitudinal portion of the energy guide chain or the entire length of the energy guide chain may be monitored with regard to joint wear. In one longitudinal portion, a number of successive chain links may to this end in each case have a first electrical component and a second electrical component, in order to form a serial cascade from a number of detection units. To this end, a number of successive link plates may be provided, for example in a longitudinal portion, each of which has in each case one first electrical component on the pin and one second electrical component on the receptacle. The link plates may have electrical conductors, which connect the two components into a circuit. In this way, a cascade may be formed from a number of "series" coupled detection units. The cascade circuit with a plurality of detection units has the advantage that increasing wear of individual articulated joints has an additive effect on the output signal.

In order to achieve signal transmission which is as far as possible independent of the number of detection units, the components may be embodied as coils, wherein the coils, for example within one link plate, have an unequal number of turns. In this case, a turns ratio may in particular be selected such that ohmic voltage losses in the cascade may be at least partly compensated.

The invention is suitable not only but in particular for energy guide chains which take the form of roller chains for long travel paths. In this case, at least some link plates, in particular every nth link plate, have rollers so the chain runs can roll on one another.

The detection units or the components thereof may be incorporated into link plates from at least one string of plates, or from both, opposing strings of plates. To this end, provision may be made for at least some link plates to have a first recess coaxially to the pin for the first component and a second recess coaxially to the receptacle for the second component.

Retrofitting of existing energy chains may however be more simply achieved if the detection units or the components thereof are incorporated at least in part on or in additional components which may optionally be fitted to the chain links. The same also applies to original equipping or new production of energy chains.

In the case of typical chain link design, consisting namely of opposing link plates which form strings of plates and therebetween a receiving space for lines, the strings of plates are held parallel at at least some chain links, for example every second one, by crosspieces connecting the link plates.

The crosspieces may be used to retrofit modular detection units, as in the case of separating webs for partitioning internal spaces. To this end, it may be provided that, in the case of at least two articulatedly connected link plates, in each case one internal part is attached in the manner of a separating web in the receiving space, between the crosspieces.

Furthermore, the detection units or their components may also be arranged at least in part on crosspieces of the chain links. In one embodiment, the first component of the detection unit may be attached to one of the link plates of the first chain link, in particular coaxially with the nominal swivel axis, and the second component of the at least one detection unit may be attached to a crosspiece of the second chain link, such that a predetermined orientation is achieved between the two when new. The first component may in particular be arranged in the receptacle of the articulated joint, which reduces manufacturing effort without impairing stability.

A suitable crosspiece preferably has a holder for receiving and attaching the second component of the detection unit. The holder may in particular comprise a retaining arm extending perpendicularly to the crosspiece, in particular in the longitudinal direction of the energy guide chain and in the direction of the plate height (distance between upper and lower narrow sides of a link plate). The second component of the detection unit may in this case be attached to an end region of the retaining arm and inherently achieves the predetermined spatial arrangement or orientation as a result of the geometry of the retaining arm. The retaining arm may thus serve to position the second component in the predetermined orientation relative to the first component in such a way that the two components interact contactlessly to sense the wear-related occurrence of radial and/or axial play in the articulated joint.

At least one of the two components may be arranged coaxially relative to the nominal swivel axis of the articulated joint. The two components of the detection unit may also be aligned coaxially with the nominal swivel axis of the articulated joint.

In particular, on application of contactless coupling according to the Hall principle one component may also be arranged coaxially and the other component arranged with a radial distance or eccentric offset relative to the nominal swivel axis. The detection unit may comprise a Hall sensor (Hall effect sensor) or be configured in the manner of a Hall sensor. One of the two components of the detection unit or of the Hall sensor may comprise a magnet, in particular a permanent magnet, or be a magnet. The other component of the detection unit or of the Hall sensor may comprise a Hall element. In this respect, an operating current of the Hall element may in particular be powered by an electronic circuit, which is electrically connected with the Hall element and which is preferably held on the holder on the crosspiece.

In the nominal operating state, the Hall element may be arranged in such a way relative to the magnet that it is located in the magnetic field of the magnet for the purpose of contactless coupling or is flowed through thereby. The magnetic field brings about a Hall voltage in the Hall element, which voltage changes in the event of a change to the relative position of the magnet with regard to the Hall element. This change to the Hall voltage may be monitored or recorded by the electronic circuit of the Hall sensor and, for example, forwarded to an evaluation unit for signal evaluation. In this case, the magnet preferably has an axis of symmetry relative to its nominal field which is arranged coaxially with the nominal swivel axis of the articulated joint, such that the Hall voltage changes measurably as the axis position varies.

The magnet may in particular be attached to one of the link plates of the first of two swivelably interconnected chain links, preferably in the joint receptacle. The Hall element and the electronic circuit of the Hall sensor may preferably be attached to the crosspiece of the second chain link. The electronic circuit and/or the Hall element may be attached to the crosspiece by a suitable holder, which comprises a retaining arm extending in the longitudinal direction of the energy guide chain and in the direction of the plate height of the link plate. The retaining arm may be connected to the crosspiece at one longitudinal end of the crosspiece and have one free end. The Hall element may be arranged at the free end of the retaining arm, preferably with its active surface or broad side substantially parallel to the link plate, on which the magnet is arranged. The retaining arm may extend with one directional component in the longitudinal direction of the energy guide chain and perpendicular to the longitudinal extent of the crosspiece and with a second directional component perpendicular to the longitudinal direction of the energy guide chain and perpendicular to the longitudinal extent of the crosspiece or in the direction of the plate height. The Hall element may be arranged with its active surface in particular perpendicular to the nominal swivel axis of the articulated joint, preferably in such a way that there is a radial distance or offset between the nominal swivel axis and a centroid of the active surface of the Hall element. Furthermore, the holder may retain the electronic circuit of the Hall sensor on the crosspiece and provide a protective guideway for lines for the Hall element and the electronic circuit. A connecting line between the circuit and an evaluation unit may thus also be carried in the energy chain.

The invention also relates to such a crosspiece per se, suitable in particular as an original element or as a retrofitted element. The crosspiece according to the invention has a holder which is usable at least for receiving a component of a detection unit for wear detection, in particular with an electronic circuit for example for a Hall element. The holder may have a retaining arm, which extends, preferably starting from one longitudinal end of the crosspiece, perpendicular to the longitudinal extent of the crosspiece, for attaching the component of the detection unit, for example a Hall element, in a predetermined spatial position in the receiving space of the energy guide chain. In particular, the retaining arm may be used to attach one of the two components of the detection unit in a predetermined position relative to the nominal swivel axis of the adjacent articulated joint, such that it may act with the other component of the detection unit to detect the wear in the articulated joint. Preferably, the retaining arm serves to mount the component of the detection unit with a radial distance or offset relative to the nominal swivel axis of the adjacent articulated joint, which connects together the link plates of a string of plates. The crosspiece may be of multipart configuration, with a modular, adapter-like holder fitting with the crosspiece and the attachment thereof.

The invention also relates to a modular internal part as additional component, in particular as an original element or as a retrofitted element. This has two conjugately arranged end regions in the longitudinal direction, each of which comes to lie axially with regard to the nominal swivel axis of the articulated joint of interconnected chain links, opposite a corresponding end region of a further internal part of identical construction. Each end region in this respect has one of the two electrical components for desired field coupling, such that the first component is attached to the end region of the one internal part and the interacting second component is attached to the opposing end region of the other internal part. The arrangement is selected such that these are capacitively or inductively couplable in each case with corresponding components of an internal part of identical construction. Furthermore, the internal part has, in a manner known per se, two attachment regions on the top and bottom for attaching to the crosspieces. The opposing end regions of the internal parts may optionally form a further articulated joint coaxially with the nominal swivel axis, but this is not essential.

Also proposed is a detection system, in particular for early detection of critical wear in articulated joints, with an energy guide chain equipped according to one of the above embodiments with at least one detection unit. In this respect, an evaluation unit for signal evaluation is connected with the at least one detection unit, in particular a cascade of detection units. This may take place in wired manner or for example via a wireless module. The evaluation unit may identify a coupling change between the first and second component(s) by way of a signal evaluation and so enables a quantitative statement about the wear or abrasion state of the articulated joint(s) under consideration. On the input side, the evaluation unit may supply the detection unit(s) with a reference voltage, in particular AC voltage. On the output side, the evaluation unit may pick off an output signal. For evaluation purposes, it may for example have a memory with a stored setpoint range for nominal operation and compare an electrical signal obtained or picked off from the detection unit or the cascaded detection units, preferably after signal filtering, with the setpoint range. If this deviates excessively, optionally after taking account of unavoidable tolerances, this is an indication of excessive wear.

The detection unit itself may, for example in the case of use of a Hall element, comprise an electronic circuit in addition to the coupled main components, to which electronic circuit at least one of the components is connected.

The invention finally also relates to an individual link plate with wear detection. In the case of a link plate with pin and corresponding receptacle for forming articulated joints with nominal swivel axis between successive chain links, it is provided according to the invention that at least one electrical component be provided in the region of an articulated joint which is contactlessly couplable with a suitable further electrical component. To this end, in particular, a first electrical component may be attached in the region of the pin with predetermined orientation relative to the nominal swivel axis, in particular coaxially with the pin, and a second electrical component in the region of the receptacle with predetermined orientation relative to the nominal swivel axis, in particular coaxially with the receptacle.

The features described above as preferred, in particular for configuring the detection units or arranging the components, are applicable to both the link plate and the crosspiece, and also to the internal part.

Further details, features and advantages of the invention are revealed without limitation by the following, detailed description of preferred embodiments made with reference to the appended figures, in which.

Figure 2A:
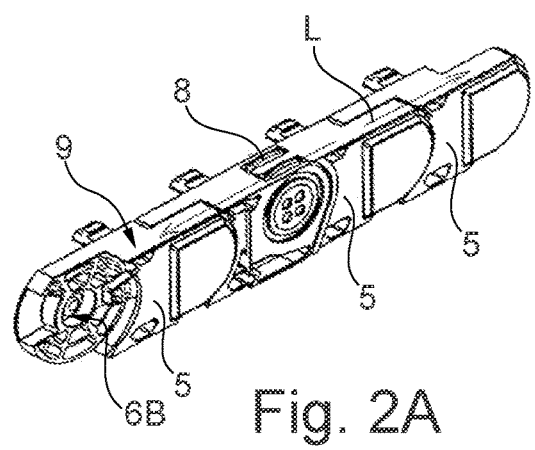
FIGS. 2A-2B show views of a link plate (FIG. 2A) in plan view and of a sub-portion of a string of a plurality of such link plates (FIG. 2B) relating to a per se known construction of an energy guide chain according to WO 2007/121713 A1.
Figure 2B:
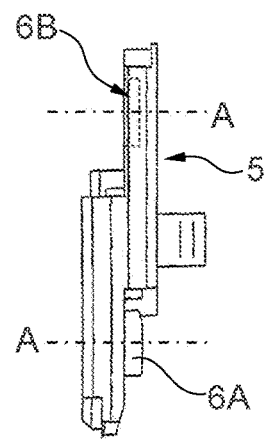
Figure 11:
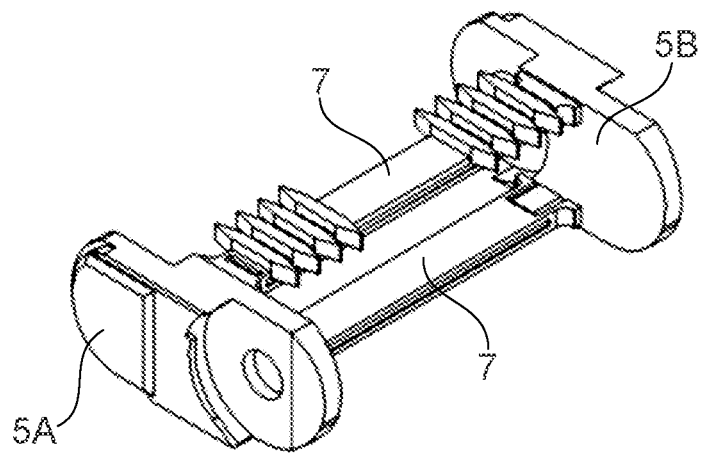
Figure 12A:
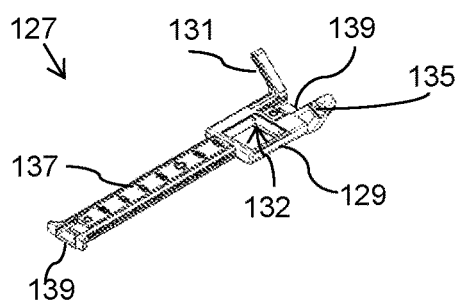
Figure 12B:
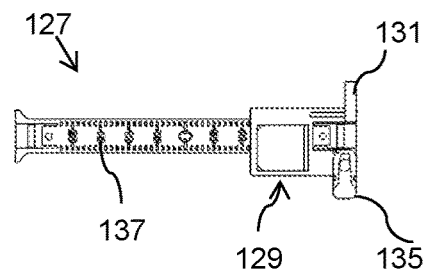
Figure 12C:
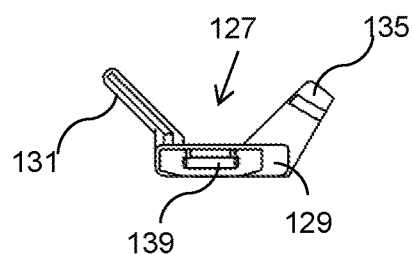
Figure 12D:
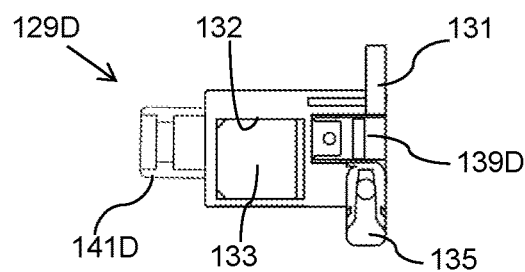

FIG. 11 shows a perspective view of a chain link consisting of two link plates and two crosspieces for an energy guide chain constructed in accordance with FIGS. 2A-2B; and FIGS. 12A-12C show an exemplary embodiment, in which one component of the detection unit is attached to a link plate and the second component is attached to a crosspiece of the adjacent link plate, in perspective view (FIG. 12A), plan view (FIG. 12B) and side view (FIG. 12C);

FIG. 12D shows a variant of FIGS. 12A-12C (in plan view); and

Figure 12E:
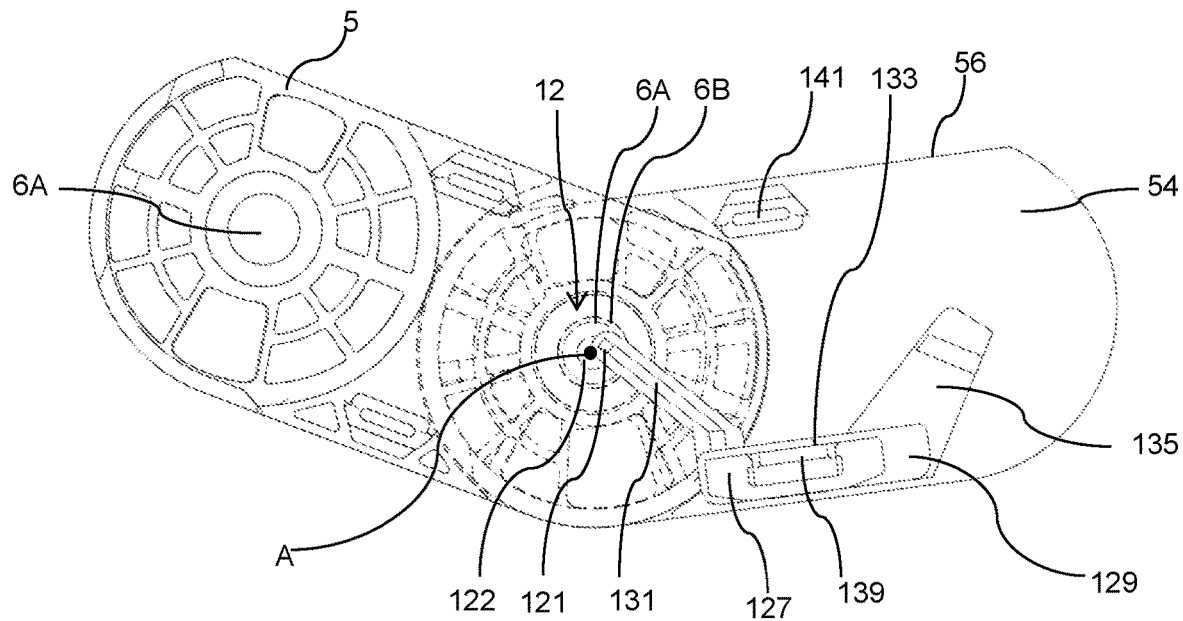

FIG. 12E shows an exemplary embodiment of the invention, with a detection unit of the Hall sensor type (in internal side view).

Figure 1:
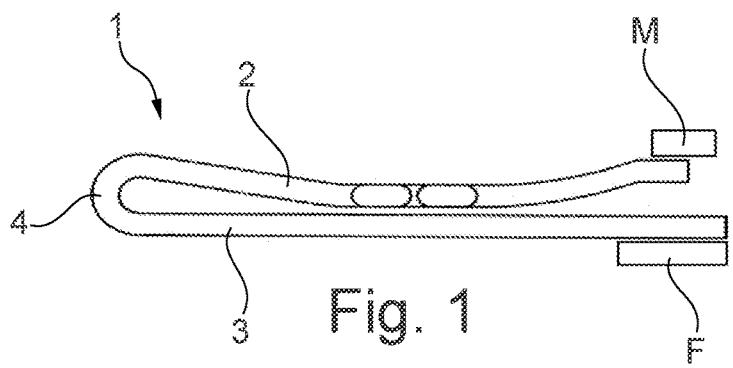
FIG. 1 is a side view of an energy guide chain.

As FIG. 1 shows, on displacement an energy guide chain 1 forms an upper run 2, a lower run 3 and a deflection arc 4 variably connecting the two runs 2, 3. The upper run 2 is attached at the end to a moving end M, for example a horizontally moving machine. The lower run 3 is fastened at the end to the fixed point F. The energy guide chain 1 guides and protects supply lines not shown in any greater detail, for example cables for electrical power and/or signals, from the fixed point F to the moving end M. The energy guide chain 1 shown in FIG. 1 is designed for long travel paths, wherein the upper run 2 may slide or roll on the lower run 3.

An energy guide chain 1 designed for long travel paths, here specifically for rolling of the upper run 2 on the lower run 3, is known for example from WO 2007/121713 A1 and illustrated purely by way of example in FIG. 2A and FIG. 2B. In this energy guide chain 1 each chain link (cf. FIG. 11) has two mirror-symmetrical side plates or link plates 5 of offset construction when viewed in plan view (cf. FIG. 2A). Each link plate 5 has a cylindrical pin 6A in one end region. At the opposing end region a cylindrical receptacle 6B dimensioned for rotatable mounting of the pin 6A is provided in the body of the link plate 5. An interacting pair of a pin 6A and a receptacle 6B in each case forms a rotary joint with the nominal axis of rotation, here denoted nominal axis A. The nominal axis A corresponds when new (with no wear to pin 6A or receptacle 6B), apart from any gap dimension needed for technical reasons, to the center axes of a joint-forming pair of pin 6A and receptacle 6B, or when new to the axis of rotation thereof. The rotation or swivel angle about the nominal axis A is defined by angle stops (cf. FIG. 2B) on the link plates 5. The individual chain links are constructed from link plates 5 and crosspieces 7 connecting them perpendicularly to the longitudinal direction L (cf. FIG. 11) and may form a deflection arc 4 (FIG. 1) of predetermined radius.

Reference is here made to the teaching of WO 2007/121713 A1 with regard to the construction of the chain links. At least some link plates 5 in this case have rollers 8, which protrude beyond the narrow sides of the link plates 5 for rolling on a running surface 9 on the opposing run 2 or 3 respectively to reduce friction. FIGS. 2A-2B show a possible design of a roller chain, merely by way of example. FIG. 2B shows merely a longitudinal portion of a string of plates. On each side of the energy guide chain 1 a string of articulatedly linked link plates 5 is provided. Opposing link plates 5 of the two strings are typically mirror-symmetrical (cf. FIG. 11).

However, the present invention is suitable in principle for any desired energy guide chains 1, including link chains with inner and outer plates (not offset), those with flexible joint connectors (cf. WO02/086349 A1) or indeed spatially deflectable line guides, for example according to EP 1 616 376 B1. The invention is also suitable for any desired spatial arrangements, for example including vertically suspended runs. It is particularly suitable for low wear energy guide chains 1 with rollers 8.

Figure 3:
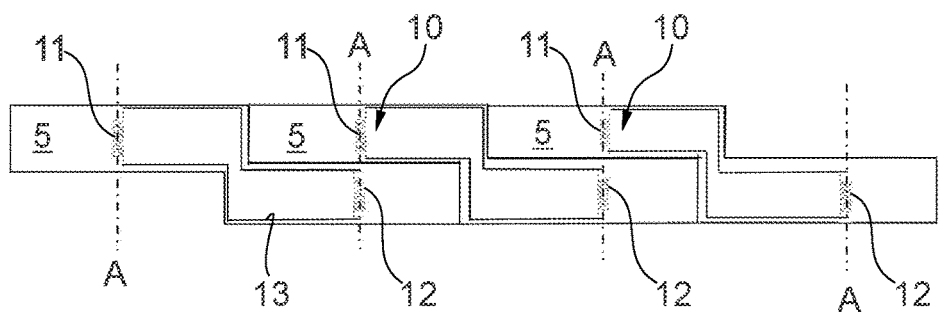
FIG. 3 is a schematic diagram of a first exemplary embodiment of the invention with inductive detection, in plan view onto a longitudinal portion of a string of plates of an energy guide chain.
Figure 9:
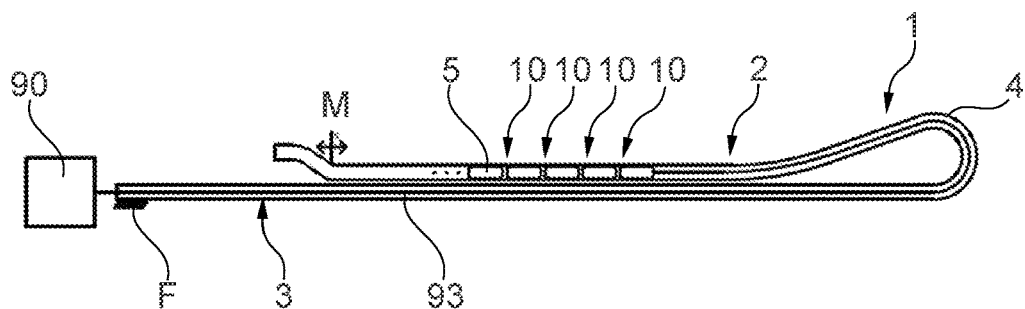
FIG. 9 is a schematic side view of a system having an energy guide chain with detection units and an evaluation unit connected to the latter.

FIG. 3 is a schematic diagram in plan view of a first exemplary embodiment. At least one string of link plates 5 has a plurality of electrotechnical detection units 10. The detection units 10 are each constructed substantially from a first electrical component, in FIG. 3 a first coil 11, and a second electrical component, in FIG. 3 a second coil 12. The first coil 11 is here located for example at the outer end region and the second coil 12 at the opposing inner end region of two articulatedly connected offset link plates 5. A number of detection units 10 is, as illustrated in FIG. 9, provided at least over one longitudinal portion of the energy guide chain 1. The longitudinal portion which experience shows is most susceptible to wear of the articulated joint consisting of pin 6A and receptacle 6B is preferably for example within the first third starting from moving end M.

The coils 11, 12 have a predetermined orientation relative to the nominal axis A or the intended swivel axis between two joined link plates 5. According to FIG. 3, coils 11, 12 are oriented with turns coaxial to nominal axis A. The coils 11, 12 are suitably permanently attached fixedly in each case in the corresponding end region of the link plate 5 in the region of the pin 6A or of the receptacle 6B to the respective link plate 5, for example interlockingly and/or non-interlockingly or by adhesive bonding or casting in. Instead of discrete wire turn components, it is also possible to print on coils. The coils 11, 12 shown here only schematically may for example take the form of flat coils and be integrated as discrete components into a recess (not shown in any greater detail), circumferentially surrounding the pin 6A or the receptacle 6B, in the link plates 5.

The coils 11, 12 of one detection unit 10 are arranged such that a desired or intended inductive coupling (mutual induction) is achieved. The coils 11, 12 are in particular coupled together inductively in such a way by suitable coil geometry and owing to the fixedly predetermined orientation relative to the nominal axis A, here aligned coaxially with nominal axis A, that a relatively high coupling factor (k) is present, for example with absolute value ABS(k)≥0.5 in magnitude terms. The coupling factor (k) depends n particular on an axially aligned relative position of the coils 11, 12. Each detection unit 10 enables a change in the coupling factor (k) or the quality of inductive signal transmission relative to a nominal coupling factor (k) or nominal signal transmission to be sensed using measuring instruments reference values therefor may for example be calibrated or input when new or, where necessary, modified by the adaptation of preset parameters (for example in the form of a graph, scaling, function parameter or the like).

According to the invention, if wear-related radial and/or axial play arises in the respective articulated joint consisting of pin 6A and/or receptacle 6B between two connected link plates 5 (and thus the chain links), the quality of the contactless coupling of the relevant detection unit 10 changes, in FIG. 3 the inductive coupling or the coupling factor (k) between two coupled coils 11, 12.

Radial play arises and increases for example with progressive wear or abrasion of the interacting sliding surfaces of pin 6A or receptacle 6B. Thus, alignment errors increasing with long-term operation generally arise in the swivel joint and thus between the two coils 11, 12 of a detection unit 10, which are in each case fixed to one of the two joined link plates. Such deviations relative to the nominal position when new change the coupling factor (k). In this way, a change in coupling arises as a function of the occurrence of joint wear, said change being capable of being sensed by measuring instruments as a change in an output signal relative to a setpoint signal range. When the energy guide chain 1 is displaced to and fro, abruptly changing alignment deviations also arise, which become more pronounced as wear increases, depending on whether thrust or tensile force is exerted; these deviations may be reliably distinguished with a suitable electronic filter, for example using DSP, relative to the setpoint signal and also signal variations (for example due to manufacturing tolerances of new articulated joints).

An undesired increase in the axial distance between the coils 11, 12 is also readily identifiable, since the axial gap dimension also influences the coupling factor (k). Undesired axial play may for example occur in the event of damage to the link plates 5 or excessive force in the strings of plates (for example by an interfering object in the travel path in the energy guide chain 1 or outside interference in a guide groove etc.). An associated detection unit 10 may also detect undesired separation of the joint consisting of pin 6A and receptacle 6B.

Figure 7:
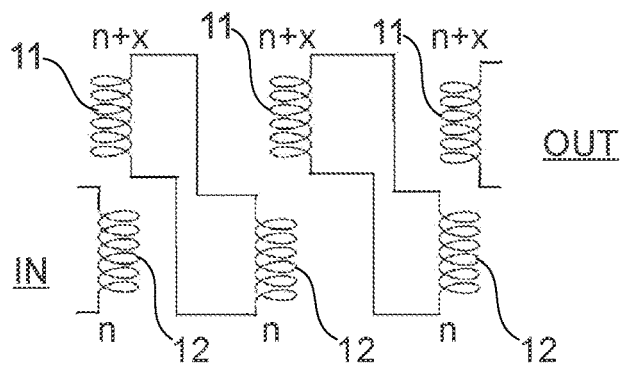
FIG. 7 is a circuit diagram showing a serial cascade of a plurality of detection units according to one of the examples of the invention shown in FIGS. 3-5.

Detection units 10 with inductively coupled coils 11, 12 according to FIG. 3 may be connected in series or in cascade over a plurality of link plates 5, in order to transmit an input signal from the input (cf. IN in FIG. 7) to the output (cf. OUT in FIG. 7). To this end, the first coil 11 and the second coil 12 in the same link plate 5 are, as shown in FIG. 3, connected into a circuit via electrical conductors 13 integrated into the link plate 5. One advantage of the inductive cascade of multiple detection units 10 is that wear-related radial deviations from the nominal axis A of multiple interacting pairs of coils 11, 12 have an additive effect on the output signal. This simplifies detection. Experience shows that joint wear over multiple successive chain links 5—at least in the longitudinal portion with the heaviest tractive/thrust force loading—seldom arises in isolated manner at individual joints 6A, 6B, but rather generally to a similar extent over multiple joints 6A, 6B. It is thus not often a question of just one articulated joint 6A, 6B, i.e. the change in the coupling factor (k) between coupled coils 11, 12 in the event of wear-related excessive radial and/or axial play is also more reliably evaluated over multiple joints with a cascade of detection units 10. The two coils 11, 12 of one detection unit 10 (or of the equipped chain links 5) may be air-core coils wound in the same or opposite directions (cf. FIG. 7) and form an air transformer.

Figure 4:
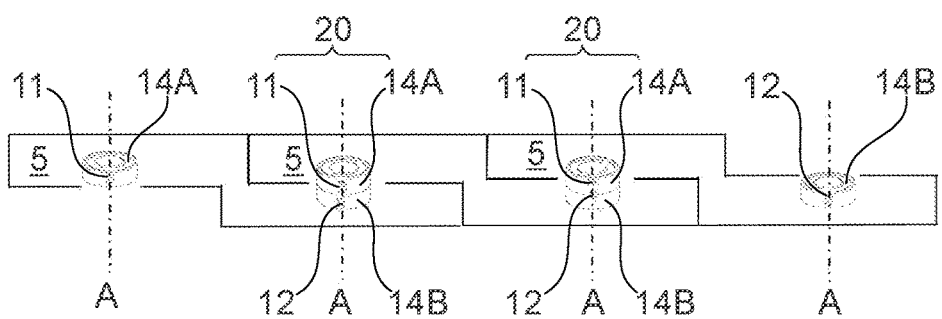
FIG. 4 is a schematic diagram in plan view of a second exemplary embodiment of the invention with inductive detection.
Figure 8:
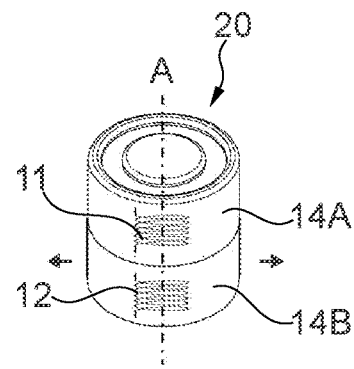
FIG. 8 is a schematic perspective view of a detection unit with cup core according to FIG. 4.

FIG. 4 shows a further exemplary embodiment of a detection unit 20 with respectively associated shallow magnetic cup core halves 14A, 14B for each of the coils 11, 12, as indicated schematically in FIG. 4. Each cup core half 14A, 14B has a cylindrical receptacle (not shown) for the associated coil 11, 12 and is made from magnetically soft material. The magnetic cup core halves 14A, 14B have a center axis and are likewise attached to the link plates 5 relative to the nominal axis A. The cup core halves 14A, 14B are located opposite one another in coaxial manner with a minimum technically feasible air gap, wherein the air gap corresponds to the play needed for swiveling between the overlapping end regions of the link plates 5. An enlarged depiction of a detection unit 20 with coils 11, 12 in respective cup core halves 14A, 14B is shown schematically in FIG. 8. With magnetic cores, the magnetic flux and the nominal coupling factor may be increased, such that minor deviations are more readily sensed (cf. relative measurement error). In addition, the dimensions of the coils 11, 12 can be reduced. Compact detection units 20 with small cup core halves 14A, 14B may be integrated for example into the opposing end faces of the pins 6A or centering projections in the bottom of the receptacles 6B (cf. FIG. 2B).

Figure 5:
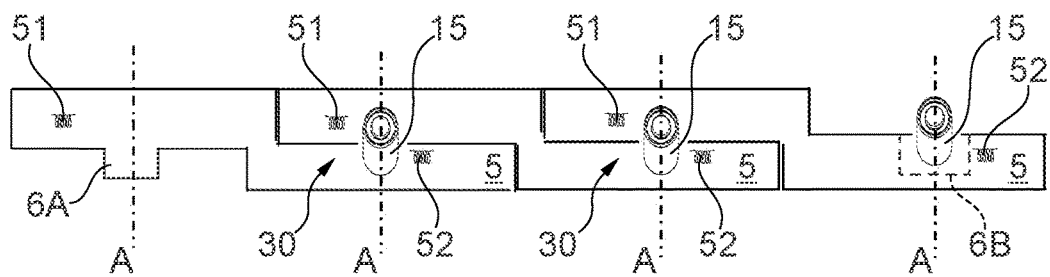
FIG. 5 is a schematic diagram in plan view of a third exemplary embodiment of the invention with inductive detection.

In the further embodiment of the detection units 30 according to FIG. 5, just one cylindrical magnetic core 15 is attached coaxially with the nominal axis A, for example protruding centrally in the receptacle 6B. The coils 51, 52 of a detection unit 30 according to FIG. 5 are here arranged with the coil axis radial relative to the nominal axis A and spatially as close as possible to the core 15. This arrangement makes it possible to detect increasing radial play in the articulated joint consisting of pin 6A and receptacle 6B due to the concomitant change in the radial air gap between at least one of the coils 51, 52 and the core 15. With this arrangement too, a cascade of multiple detection units 30 is preferably provided. When viewed in the plane of the side view of the link plate 5, the axes of the coils 51, 52 are preferably roughly parallel in the extended position or are situated in such a way that no appreciably stronger magnetic coupling arises in the deflection arc 4.

As a further variant similar to FIG. 5, a compact permanent magnet 15 may be arranged coaxially with the nominal axis on the pin 6A of the one link plate 5, the position thereof being monitored using a Hall sensor (not shown) at or around the receptacle 6B of the other link plate 5, in order to identify position displacements.

Figure 6:
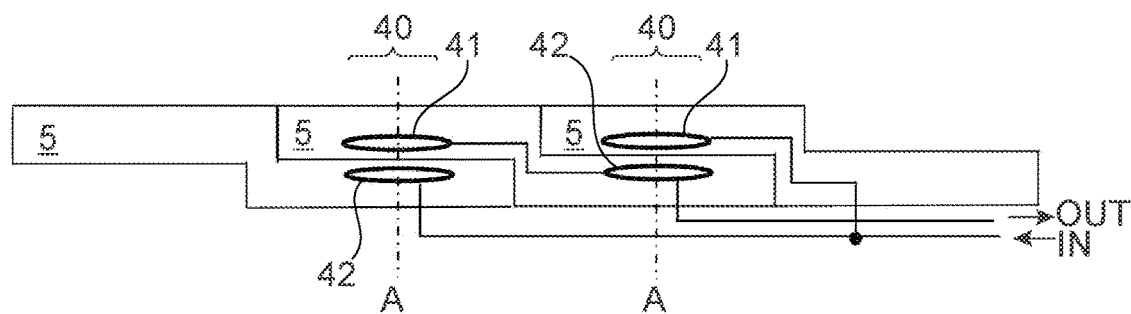
FIG. 6 is a schematic diagram in plan view of a fourth exemplary embodiment of the invention with capacitive detection.

FIG. 6 shows by way of example a solution comparable to FIGS. 3-5 in terms of arrangement. In FIG. 6, by way of example, just two capacitively operating detection units 40 are provided, which each have two for example circular disk-shaped coupling electrodes 41, 42. The first electrode 41 is here also attached to a link plate 5 coaxially with the nominal axis A. The second electrode 42 is attached to the adjoining link plate 5 likewise coaxially with the nominal axis A. The electrodes 41, 42 are here capacitively coupled for signal transmission. A change in capacitive coupling is also brought about in the case of the detection units 40 by wear-related radial play or indeed by axial play in the articulated joint consisting of pin 6A and receptacle 6B. Detection units 40 with capacitive coupling are considered if a cascade over multiple chain links or link plates 5 is undesirable or unnecessary. For example, in each case two conductively connected first electrodes 41 may, together with two conductively connected second electrodes 42, form a capacitor the capacitance of which is measured. Detection units 40 operating on a capacitive principle are of lighter construction and are generally smaller in volume. Application using additive methods or by printing would moreover be simpler.

An arrangement with in each case just one inductive detection unit 10; 20; 30 or in each case just one capacitive detection unit 40 on selected, spaced-apart chain links or just one chain link of the energy guide chain 1 is within the scope of the invention.

FIG. 7 shows, for the examples in FIGS. 3-5 and FIG. 10, different turn numbers n, n+x for the first coil 11 or 51, respectively, and the second coil 12 or 52, respectively. The turns ratio n+x/n between the coils 11, 12; 51, 52 may be selected such that ohmic voltage losses in the cascade are at least partly compensated, thereby enabling a cascade circuit of detection devices 10; 20; 30; 50 even over a relatively large number of chain links (FIG. 11). In addition, FIG. 7 illustrates the input IN of the circuit arrangement of cascaded detection devices 10; 20; 30; 50, at which a predetermined AC voltage, for example a sinusoidal voltage, is applied as reference signal. By inductive transmission or magnetic coupling between the coils 11, 12 or 51, 52 respectively, an output signal can be picked off at the output OUT. The voltage amplitude at the output OUT is dependent in particular on the respective coupling factors k(n) of the number n of concatenated or cascaded detection devices 10; 20; 30; 50 and thus also on undesired wear-related play in the articulated joints consisting of pin 6A and receptacle 6B. The output signal is optionally filtered with an evaluation unit 90, cf. FIG. 9, and suitably compared with a predetermined nominal range, e.g. learned on commissioning. Increasing wear of the articulated joints 6A-6B is in this way electrotechnically measurable for the evaluation unit 90, in particular as a reduction in the voltage amplitude of the output signal at the outlet OUT.

FIG. 9 shows a block diagram illustrating a wired connection of the evaluation unit 90 via a signal line 93 with a cascade consisting of a number n of detection units 10 on selected chain links 5 in the first third of the energy guide chain 1 at the moving end M. The signal line 93 is also guided in the energy guide chain 1. A wireless connection is also possible, for example via a suitable radio module.

Figure 10:
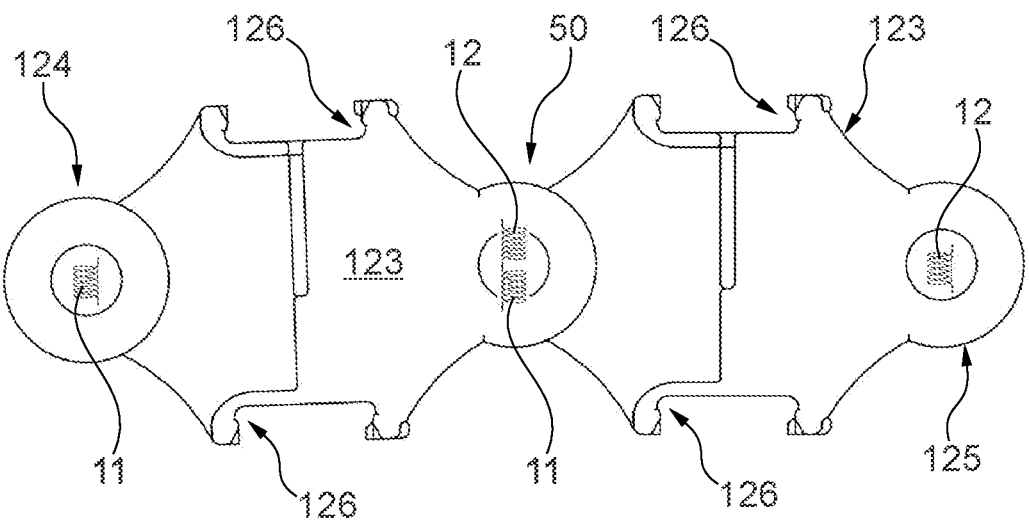
FIG. 10 shows a fifth exemplary embodiment of the invention with inductive detection, wherein detection units are provided on internal parts which may be arranged in the manner of separating webs in the receiving space of the energy guide chain.

FIG. 10 shows an embodiment for a detection device 50 which allows retrofitting of existing energy guide chains 1, or does not require any change to the link plates 5. In this case, special internal parts 123 are provided, which have opposing end regions 124, 125, with a receptacle for in each case one associated coil 11, 12 as shown in principle in FIG. 3 or FIG. 4. The internal parts 123 are slightly offset in plan view, such that the end regions 124, 125 oppposingly adjoin one another with minimum axial spacing on the nominal axis A, in order to achieve a high degree of coupling or high coupling factor (k) of the coils 11, 12. Apart from the above, the internal parts 123 are similarly configured to per se known separating webs for horizontal partitioning of the interior or receiving space in the chain links (cf. FIG. 11), in particular with opposing attaching regions 126, in each case at the head and foot of the internal parts 123, which allow stable fixed latching between the crosspieces 7 (cf. FIG. 11) and thus allow stable positional fixing, stationary in the longitudinal direction L, in the energy guide chain 1. This design allows retrofitting in a plurality of existing energy guide chains 1, without the configuration of pre-existing components having to be modified.

FIG. 11 shows purely by way of example an individual chain link consisting of two mirror-symmetrical side plates 5A, 5B, which are connected firmly together via two parallel crosspieces 7. The invention is also applicable to other types of line guides, for example with just one string of plates (cf. EP1340299B1).

FIGS. 12A-D show a concept for attaching a detection unit 120 to the chain links or side plates using a crosspiece. The concept is illustrated in FIGS. 12A-D specifically for the detection unit 120 according to FIG. 12E, but is likewise also suitable for a detection unit 10; 20; 30; 40; 50 according to FIGS. 1-9.

FIGS. 12A-12C show a special crosspiece 127, which may be used for attachment and predetermined orientation of one of two essential electrical sensor components of the detection unit 120. The crosspiece 127 has a holder 129 at one longitudinal end, which holder receives components of the detection unit 120. The holder 129 comprises a retaining arm 131 for a component 121 (cf. FIG. 12E) and a receptacle 132 for an electronic circuit 133, with which the component 121 is connected. The retaining arm 131 extends perpendicular to the longitudinal extent of the crosspiece 127 and has one free end, on which the component 121 is mounted. The crosspiece 127 has latching recesses 139 at its two longitudinal ends for attaching to conventional latching lugs 141 of the link plates 5A, 5B (cf. FIG. 11).

The holder 129 may be produced in one piece with the crosspiece 127, as shown in FIGS. 12A-12C. Alternatively, the holder 129 may also take the form of a separate component for equipping or retrofitting on conventional crosspieces 7 (cf. FIG. 11), in order to be attached to the crosspiece 7, in particular interlockingly and/or non-interlockingly mounted on the inside relative to the receiving space for lines (not shown).

FIG. 12D shows as a variant an example of a holder 129D for existing crosspieces 7. The holder 129D has at one longitudinal end a latching lug 141D of identical construction to the conventional latching lug 141 of a side plate 5. The latching lug 141D enables attachment of a conventional crosspiece 7 with corresponding latching recess 139. At the other longitudinal end of the holder 129D a latching recess 139D of identical construction to the conventional latching recess 139 is provided on the crosspiece 7. In this way, the holder 129D may be used as an adapter or intermediate piece for connecting a crosspiece 7 with the latching lug 141 of the link plate 5. The dimensions of the holder 129 in the longitudinal direction of the crosspiece may in this case correspond to the modular dimension of conventional crosspieces 7 (length difference between successive crosspiece structural sizes), such that a shorter crosspiece 7 with the holder 129D corresponds to a standard length of the next larger crosspiece.

Holders 129; 129D as shown in principle in FIGS. 12A-12D may be used for all the detection units 10; 20; 30; 40; 50; 120 proposed here. FIG. 12E shows the holder 129 or 129D attached to one of two articulatedly interconnected link plates 5 in internal side view (concealed elements shown with broken lines). The retaining arm 131 extends with two directional components perpendicular to the longitudinal extent of the crosspiece 127 and inwards into the central height region between the narrow sides 56 of the link plate, i.e. roughly parallel with the broad side 54 of the link plate. The free end region of the retaining arm 131 is here arranged or oriented at a slight radial distance or eccentric offset relative to the nominal axis A, with the nominal axis A perpendicular to the broad sides 54 of the link plates 5 (and approximately to the plane of the drawing of FIG. 12E).

FIG. 12E further shows a detection unit 120 which is configured according to the Hall sensor principle. This comprises a Hall element 121 as one of two main components of the Hall sensor, and a permanent magnet 122 as second main component of the Hall sensor 120. The permanent magnet 122 is for example configured in the form of a circular disk, with an axis of symmetry of the magnetic field (through both magnetic poles). The permanent magnet 122 is here attached in a receptacle 6B of the one link plate 5 (on the left in FIG. 12E), for example interlockingly and/or non-interlockingly or by adhesive bonding or casting in, and is oriented such that its magnetic field is oriented coaxially and symmetrically to the nominal axis A of the articulated joint.

The Hall element 121 interacting with the permanent magnet 122 is attached to the second chain link, namely to the free end of the retaining arm 131. The arrangement and orientation are such that the Hall element 121 is oriented suitably with its active surface relative to the magnetic field of the permanent magnet 122, at least in a nominal position when the energy guide chain 1 is new. The active surface of the Hall element 121 may for example be oriented perpendicular to the axis of symmetry of the magnetic field. Furthermore, the arrangement is selected such that the nominal axis A of the articulated joint extends with a slight offset or radial distance relative to a centroid of the active surface of the Hall element 121. The electronic circuit 133 of the Hall sensor is attached in the receptacle 132 of the holder 129 of the crosspiece 127. The holder 129 additionally has a guideway 135 for the line connecting the electronic circuit 133 to evaluation unit 90. The connecting line to the Hall element is guided in the retaining arm 131. When in operation, operating current flows through the Hall element 121, wherein the current flow, at least in the nominal position, runs for example perpendicular to field lines of the magnet 122. The Hall voltage at the Hall element 121 caused by the magnetic field is sensed by the electronic circuit 133 of the Hall sensor using measuring instruments and evaluated or for example forwarded to the evaluation unit 90. As wear to the sliding surfaces of the pin 6A or the receptacle 6B progresses, an alignment error increasingly arises, as described above, in the swivel joint, such that the position of the nominal axis A or the position of the magnet 122 relative to the Hall element 121 deviates from the nominal position when new, for instance through a change in the axial and/or radial distance of the Hall element from the magnet and/or the orientation of the Hall element relative to the magnetic field. This brings about a change in the Hall voltage at the Hall element 121, which is identified by the electronic circuit 133 or passed on to the evaluation unit 90.

The configuration of the link plates 5 may otherwise correspond to the teaching of EP2010800B1, to which reference is made in this respect. The detection unit(s) 120 are here preferably provided on link plates 5 without rollers.

A plurality of articulated joints of an energy guide chain 1 may be equipped with a Hall sensor as detection unit 120, wherein the Hall sensors of different chain links are connected with an evaluation unit 90 for better signal discrimination or wear detection.

LIST OF REFERENCE SIGNS

1 Energy guide chain
2 Upper run
3 Lower run
4 Deflection arc
5 Link plate
5A, 5B Side plates (chain link)
54 Broad sides of the link plates
56 Narrow sides of the link plates
6A Pin
6B Receptacle
7, 127 Crosspiece
8 Roller
9 Running surface
10; 20; 30; 40; 50; 120 Detection unit
11, 51 First coil
12, 52 Second coil
13 Conductor
14A, 14B Cup core half
15 Magnetic core
41 First coupling electrode
42 Second coupling electrode
90 Evaluation unit
93 Signal line
121 Hall element
122 Magnet
123 Internal part
124, 125 End region
126 Attachment region
129; 129D Holder
131 Retaining arm
132 Receptacle
133 Electronic circuit
135 Guideway
137 Positioning marking
139 Latching recess
141 Latching lug
A Nominal axis
F Fixed point
IN Signal input OUT Signal output
M Moving end (machine)
L Longitudinal direction

The invention claimed is:

1. An energy guide chain (1) with wear detection, comprising a number of chain links, which are configured for protected guidance of lines between a first connection end (F) and a second connection end (M) movable relative thereto, wherein each chain link has at least one link plate (5) and link plates (5) of adjacent chain links are each connected together in the longitudinal direction (L) by an articulated joint with a nominal swivel axis (A), wherein each articulated joint comprises
a pin (6A),
a corresponding receptacle (6B), and
at least one detection unit (10, 20, 30, 40, 50, 120) for detecting wear on at least one chain link, the at least one detection unit (10, 20, 30, 40, 50, 120) comprises
a first electrical component (11, 41, 51, 121), which is attached with a predetermined orientation to a first chain link, and
a second electrical component (12, 42, 52, 122), which is attached with a predetermined orientation to an adjacent second chain link that is articulatedly connected to the first chain link,
wherein the electrical components interact in contactlessly coupled manner to sense a change in the coupling in the event of wear-related occurrence of radial and/or axial play in the articulated joint between two chain links.

2. The energy guide chain (1) as claimed in claim 1, wherein the at least one detection unit (120) comprises as the electrical components a magnet (122) and a Hall element (121) interacting with the magnet (122).

3. The energy guide chain (1) as claimed in claim 1, wherein the at least one detection unit (10, 20, 30, 50) comprises a first coil (11, 51) as the first electrical component and a second coil (12, 52) as the second electrical component.

4. The energy guide chain (1) as claimed in claim 3, wherein the first (11, 51) and second (12, 52) coils are arranged opposite one another coaxially with the nominal swivel axis (A) of the articulated joint; or the first (11, 51) and second (12, 52) coils are embodied as cylindrical coils, which are oriented perpendicular to the nominal swivel axis (A) of the articulated joint.

5. The energy guide chain (1) as claimed in claim 3, wherein the two coils (11, 51, 12, 52) have at least one associated magnetic core (15), which is attached to the first or second chain link coaxially relative to the nominal swivel axis (A).

6. The energy guide chain (1) as claimed in claim 1, wherein the at least one detection unit (40) comprises a first electrode (41) as the first electrical component and a second electrode (42) as the electrical second component, wherein the electrodes (41, 42) each have an axis of symmetry, which is arranged coaxially with the nominal swivel axis (A) of the articulated joint.

7. The energy guide chain (1) as claimed in claim 1, wherein, to form the articulated joint between adjacent chain links, each link plate (5) has one pin (6A) at a first end region and one receptacle (6B) at a second end region, wherein, in the case of at least two articulatedly connected link plates (5), the first electrical component is arranged on the pin (6A) of the one link plate (5), and/or the second electrical component is arranged on the receptacle (6B) of the other link plate (5).

8. The energy guide chain (1) as claimed in claim 2, wherein each chain link comprises two opposing link plates (5A, 5B), which define a receiving space for lines, with at least some of the opposing link plates (5A, 5B) being connected by crosspieces (7), wherein the first electrical component of the at least one detection unit (120) is attached to one of the link plates (5) of the first chain link and the second electrical component of the at least one detection unit (120) is attached to a crosspiece (127) of the second chain link connected articulatedly to the first chain link.

9. The energy guide chain (1) as claimed in claim 8, wherein the crosspiece (127) has a holder (129) with a retaining arm (131) on which the second electrical component of the detection unit (120) is mounted, wherein the retaining arm (131) extends transversely of the crosspiece (127), in order to position the second electrical component relative to the first electrical component in such a way that the two electrical components may interact to sense wear-related radial and/or axial play in the articulated joint.

10. The energy guide chain (1) as claimed in claim 1, wherein the link plates (5) are embodied as offset link plates with the pin (6A) and the corresponding receptacle (6B), wherein at least some link plates (5) have rollers (8) to allow the energy guide chain (1) to roll; and/or at least some link plates (5) have a first recess coaxial with the pin (6A) for the first electrical component.

11. The energy guide chain (1) as claimed in claim 1, wherein each chain link comprises two link plates (5A, 5B), the link plates (5A, 5B) forming opposing strings of plates which define a receiving space, and the strings of plates being held in parallel at at least every second chain link by crosspieces (7) connecting the link plates (5A, 5B), wherein, in the case of at least two articulatedly connected link plates (5), an internal part (123) is in each case attached in a receiving space between crosspieces (7), wherein the internal parts (123) have two axially opposing end regions (124, 125) on the nominal swivel axis (A) of the articulated joint of the link plates (5) and at the end region (124, 125) of the one internal part (123) the first electrical component is attached and at the end region (124, 125) of the other internal part (123) the second electrical component is attached.

12. The energy guide chain (1) as claimed in claim 1, wherein in a longitudinal portion a number of successive chain links in each case have the first electrical component and the second electrical component, wherein a serial cascade consisting of multiple detection units (10; 20; 30; 40; 50; 120) is provided.

13. The energy guide chain (1) as claimed in claim 12, wherein the first and second electrical components are embodied as coils (11, 12), and the coils of a link plate (5) have an unequal number of turns with a turns ratio which at least partly compensates voltage losses in the cascade.

14. The energy guide chain (1) as claimed in claim 2, wherein the detection unit (120) has an electronic circuit (133) and the magnet (122) configured to bring about a Hall voltage in the Hall element (121) which is measurable by the electronic circuit (133), in order for the electronic circuit (133) to sense a wear-related change in the relative position of the magnet (122) with regard to the Hall element (121), wherein the magnet (122) has an axis of symmetry which is arranged coaxially with the nominal swivel axis (A) of the articulated joint and the Hall element (121) is arranged eccentrically relative to this axis of symmetry.

15. The energy guide chain (1) as claimed in claim 14, wherein the magnet (122) is attached to one of the link plates (5) of the first chain link in a receptacle (6B) of the articulated joint, and the Hall element (121) is attached to a crosspiece (127) of the second chain link to a retaining arm (131) of the crosspiece (127) extending transversely of the crosspiece.

16. A detection system having the energy guide chain as claimed in claim 1, the system further having an evaluation unit (90) connected for signal evaluation with the at least one detection unit (10; 20; 30; 40; 50; 120).

17. The detection system as claimed in claim 16, wherein the evaluation unit (90) is configured to supply the detection unit(s) (10; 20; 30; 40; 50) with a reference voltage on the input side, in order to pick off an output signal on the output side and/or has a memory with a stored setpoint range for nominal operation and compares an electrical signal picked off from the detection unit from a plurality of cascaded detection units, after filtering, with the setpoint range.

18. A link plate (5, 5A, 5B) for an energy guide chain (1) with wear detection, with a pin (6A) and a corresponding receptacle (6B) for forming articulated joints each with a nominal swivel axis (A) between successive chain links, wherein a first electrical component is attached in the region of the pin (6A) with a predetermined orientation relative to the nominal swivel axis (A) coaxially with the pin (6A), and a second electrical component is attached in the region of the receptacle (6B) with a predetermined orientation relative to the nominal swivel axis (A) coaxially with the receptacle (6B).

19. An arrangement for an energy guide chain (1) with wear detection, the arrangement comprising a pair of chain links of the energy guide chain (1) connected together by an articulated joint, with in each case two link plates, which are held parallel by crosspieces connecting the link plates, and with in each case one internal part (123) attached between the crosspieces (7) in each of the two chain links of the pair,
  wherein the two internal parts (123) have interacting conjugate end regions (124, 125) which are arranged opposite one another axially relative to a nominal swivel axis of the articulated joint of the two interconnected chain links,
  wherein a first component is attached at one end region (124, 125) of one internal part (123) and a second component is attached at the end region (124, 125) of the other internal part (123),
  wherein the components are capacitively or inductively coupled in order to be able to identify a change in the coupling in the event of wear-related occurrence of radial and/or axial play in the articulated joint between the two chain links.

20. The arrangement as claimed in claim 19, wherein one internal part in each case has two attachment regions for top and bottom attachment to the crosspieces.

* * * * *